United States Patent [19]
Kuo

[11] Patent Number: 6,135,056
[45] Date of Patent: Oct. 24, 2000

[54] AUTOMATIC PET FOOD DISPENSER AT DEFINITE TIMES AND FOR A DEFINITE QUANTITY

[76] Inventor: Yung-Fang Kuo, No. 701, Pai Sha Rd. Chieh Ting, Hsiang, Kaohsiung Hsien, Taiwan

[21] Appl. No.: 09/296,862

[22] Filed: Apr. 22, 1999

[51] Int. Cl.[7] .................................................. A01K 5/02
[52] U.S. Cl. ...................... 119/51.11; 119/56.2; 119/57.1; 119/57.92; 119/53; 222/643; 222/650; 222/413
[58] Field of Search ............................ 119/51.01, 51.11, 119/51.12, 52.1, 53, 56.1, 56.2, 57, 57.1, 57.92; 222/639, 642, 643, 644, 650, 413

[56] References Cited

U.S. PATENT DOCUMENTS

| | | | |
|---|---|---|---|
| 3,150,798 | 9/1964 | Sutton | 222/32 |
| 3,556,057 | 1/1971 | Icking | 119/51.5 |
| 3,985,104 | 10/1976 | Klemer | 119/51.12 |
| 4,185,587 | 1/1980 | Kallin | 119/51.11 |
| 4,665,862 | 5/1987 | Pitchford, Jr. | 119/51.11 |
| 4,782,790 | 11/1988 | Batson | 119/51.11 |
| 5,230,300 | 7/1993 | Mezhinsky | 119/51.11 |
| 5,239,943 | 8/1993 | Kim | 119/51.12 |
| 5,299,529 | 4/1994 | Ramirez | 119/51.11 |
| 5,363,805 | 11/1994 | Wing | 119/51.11 |
| 5,370,080 | 12/1994 | Koepp | 119/51.11 |
| 5,433,171 | 7/1995 | Erwell | 119/51.5 |
| 5,483,923 | 1/1996 | Sabbara | 119/51.11 |

*Primary Examiner*—Michael J. Carone
*Assistant Examiner*—James S. Bergin
*Attorney, Agent, or Firm*—Pro-Techtor International Services

[57] ABSTRACT

An automatic pet food dispenser at preset times and for a definite quantity includes a dispenser body, a food storing tank, a funnel-shaped receiver, a transporting mechanism. The transporting mechanism consists of a food pipe and a screw conveyer deposited in the food pipe and rotated by a motor for transporting pet food by the screw conveyer to let the food fall down from the storing tank, through the funnel-shaped receiver, and a timer for presetting times of start and stop and thus the period of operating time of the motor. The dispenser body has a food exit formed in a bottom wall and connected to the lower end of the food pipe, and a food trough movably provided in the bottom portion of the dispenser body to pulled out thereof to receive pet food falling down from the food exit.

1 Claim, 3 Drawing Sheets

AUTOMATIC PET FOOD DISPENSER AT DEFINITE TIMES AND FOR A DEFINITE QUANTITY

BACKGROUND OF THE INVENTION

This invention relates to an automatic pet food dispenser, particularly to one automatically dispensing a definite quantity of pet food at preset times.

Nowadays pets such as dogs, cats, etc. are kept by many people for fun and relax of their minds, but there are inconveniences as follows in feeding them.

1. When the keeper of a pet cannot come home to feed it, it may have not food to eat and starve.

2. When the keeper of a pet will be away for a travel for many days, a pet has to be kept by a friend or a relative temporarily.

3. A pet may be kept by a pet shop when the keeper of the pet are away from home, but the charge may not be cheap, and sometimes a pet may contract some disease from other pets kept in the shop.

And there is a known pet food dispenser disclosed in a Taiwan patent No. 110516, which includes a base, a push plate, a guide cylinder, a cylinder, a cap and a bottom base. When the push plate is pushed by a pet, pet food falls out of the cylinder.

However, the known conventional pet food dispenser has disadvantages as follows in its practical use.

1. It has many components, taking time in manufacturing and assembling, resulting in high cost.

2. A pet must touch and push the push plate to get food falling out of the dispenser, and if a pet has a too low IQ to touch and push the push plate, it may be starved to death, or the keeper has to touch the push plate instead of the pet.

3. A smart pet may play with the push plate to let food fall out, wasting pet food.

4. Food in the dispenser cannot be controlled in its quantity to fall out whenever the push plate is pushed so that a pet may eat too much to affect its health.

5. If the keeper of a pet is to be away from home for days, the pet food dispenser may not be large enough to keep food therein for the pet to eat during the period of time when the keeper is away.

SUMMARY OF THE INVENTION

In view of the disadvantages of the known conventional pet food dispenser, this invention has been devised to offer an automatic pet food dispenser possible to dispense pet food at preset definite times for a definite quantity.

The feature of the invention is a timer for presetting time of start and stop of a motor rotating a screw conveyer fitted in a material pipe deposited in a dispenser body for transporting pet food stored in a funnel-shaped receiver and a pet food store tank installed on the dispenser body and communicating with the upper opening of the funnel-shaped receiver. When the timer commands the motor to operate for the preset period of time, pet food moves out of a food exit formed in a bottom wall of the dispenser body and connected to a lower end of the material pipe. And a drawer-shaped food trough is movably provided in the lower end of the the dispenser body to receive pet food falling out of the food exit.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
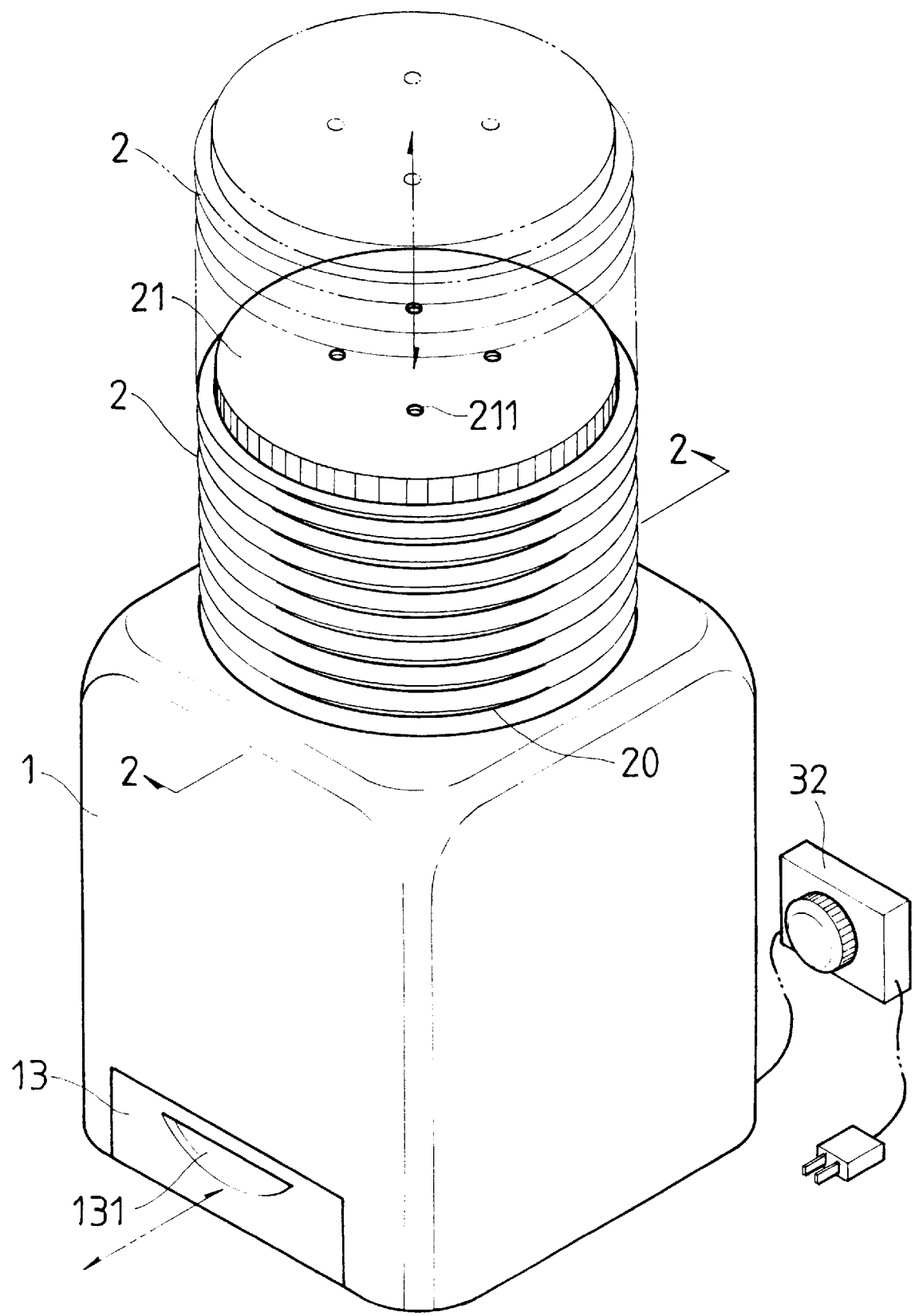
FIG. 1 is an exploded perspective view of an automatic pet food dispenser at definite times for a definite quantity in the present invention.
Figure 2:
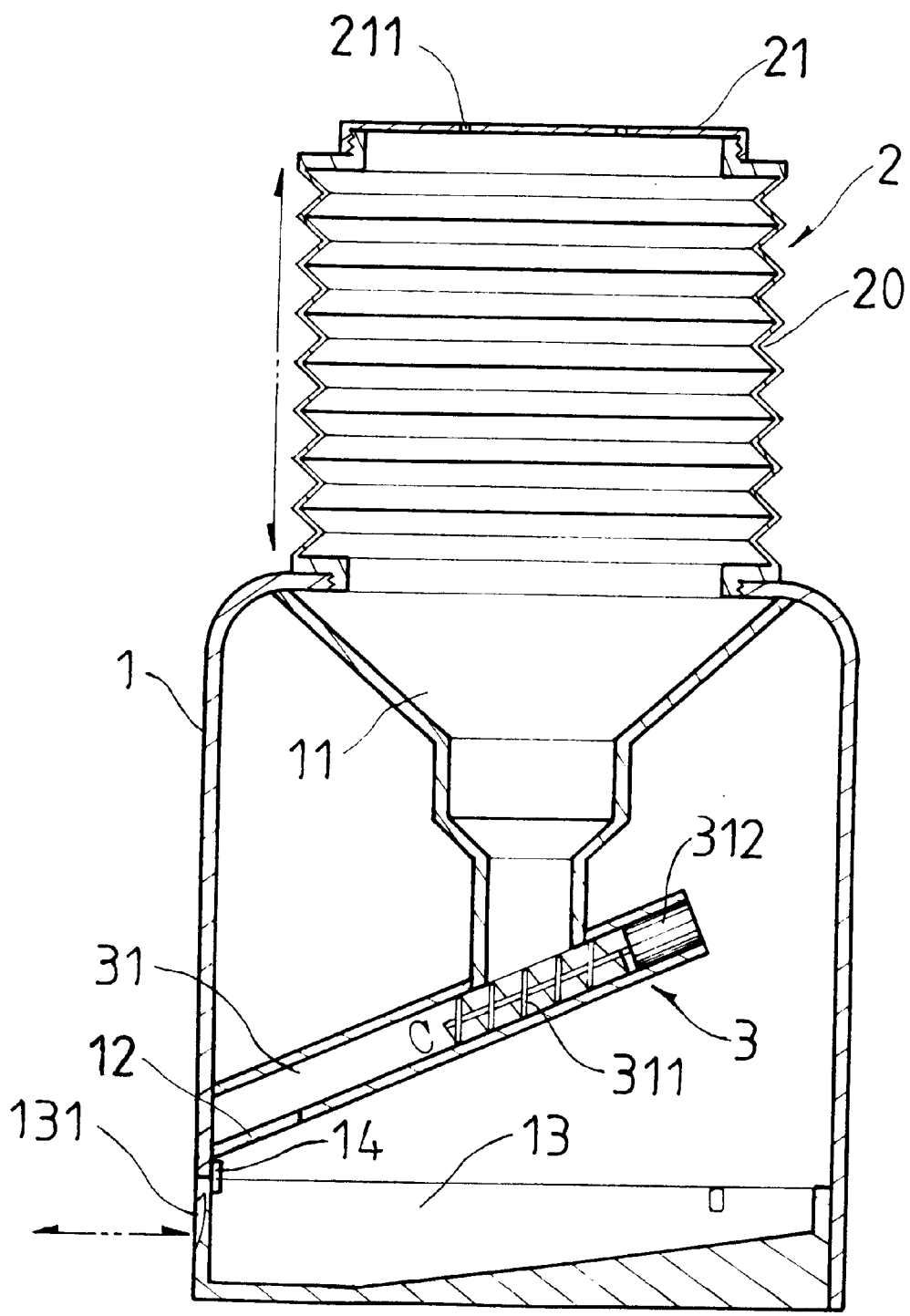
FIG. 2 is a cross-sectional view of line 2—2 in FIG. 1.

A preferred embodiment of an automatic pet food dispenser at definite times and for a definite quantity in the present invention, as shown in FIG. 1, includes a dispenser body 1, a food storing tank 2, and a transporting mechanism 3 as main components combined together.

The dispenser body 1 has a hollow cylindrical shape, having a funnel-shaped receiver 11 provided in a center upper portion having an upper opening communicating with a lower opening of the food storing tank 2 and a lower end combined with an upper portion of the transporting mechanism 3. The dispenser body 1 further has a food exit 12 formed in a front end of a bottom wall and a projecting-down stop 14 fixed on a lower end of the front wall for stopping a drawer-shaped food trough 13 in case of the food trough 13 is pulled out.

The food storing tank 2 has an upper opening and a lower opening, a vertical bellow member 20 for increasing and decreasing its height or stored pet food, an upper cap 21 releasably closing the upper opening and having one or more air holes 211 for ventilation inside the tank 2 and balance of the outer and the inner atmosphere of the tank 2 so that the pet food stored therein may fall smoothly down to the funnel-shaped receiver 11 and be kept from getting musty. The lower opening of the tank 2 is connected to and communicates with the funnel-shaped receiver 11 to permit the food in the tank 2 into the funnel-shaped receiver 11. The vertical bellow member 20 can enable the tank 2 to be adjusted in its height to increase or decrease the quantity of pet food to be stored therein according to necessity.

The transporting mechanism consists of a food pipe 31, a screw conveyer 311 installed in the food pipe 31, a motor 312 rotating the screw conveyer, and a timer for controlling the times of start and stop of the motor 312 by a user to preset, and then the quantity of pet food falling out may be limited.

The food trough 13 movably installed in the bottom portion of the dispenser 1 has a recess 131 formed in its front side for pulling out of or pushing in the dispenser body 1.

Figure 3:
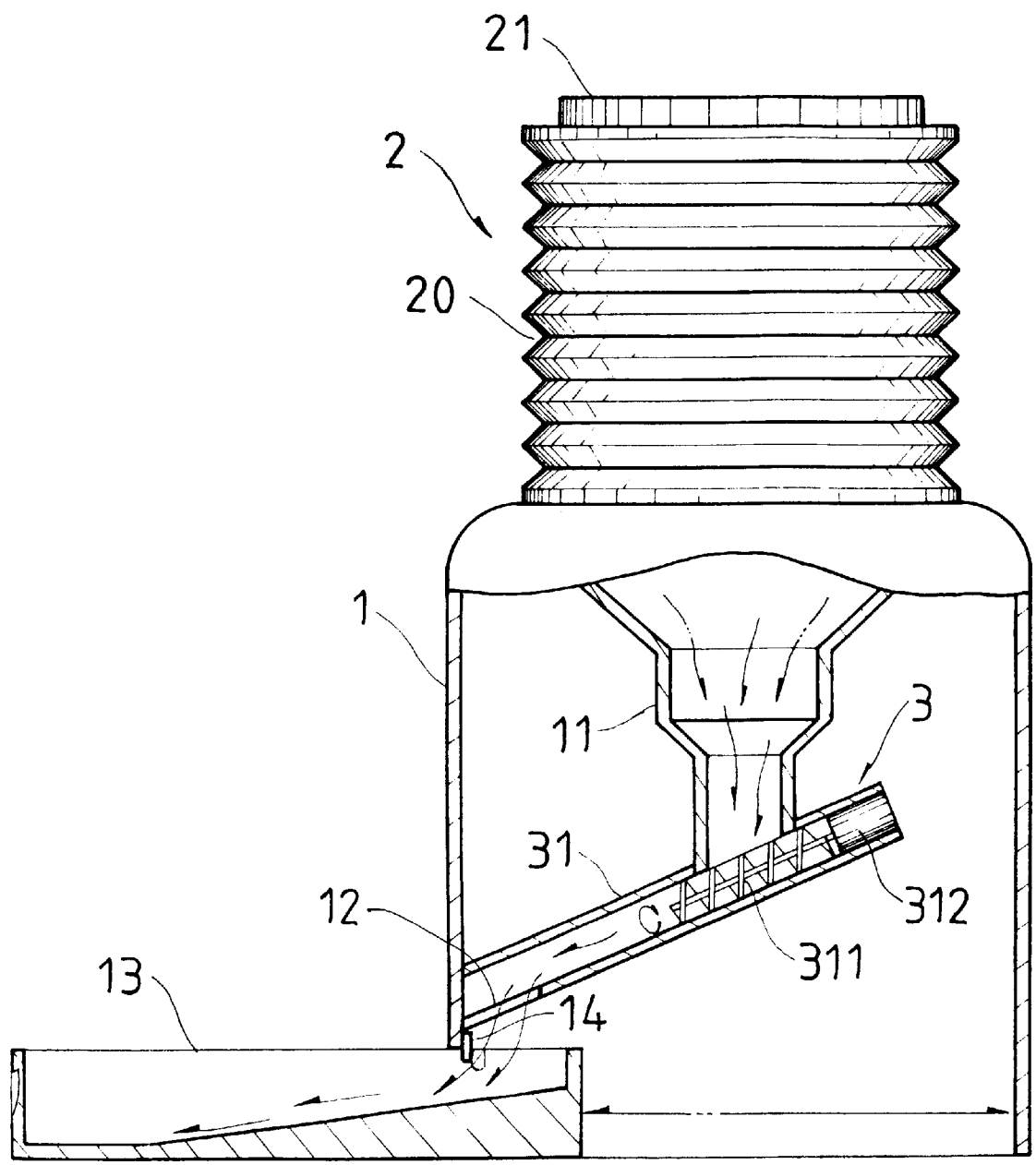
FIG. 3 is a cross-sectional view of the automatic pet food dispenser in the present invention, showing pet food falling out of the dispenser.

In using, as shown in FIG. 3, pet food is poured in the food storing tank 2 and in the funnel-shaped receiver 11, and the timer 32 is preset in the times of start and stop of the motor 312 and the period of operating time of the motor 312, and then the plug of the motor 312 is inserted in a socket of electric power. And the food trough 13 is pulled out of the dispenser body 1 at the same time.

When a preset time of starting of the motor 312 comes, the timer automatically commands the motor start to rotate the screw conveyer 311, which then rotates to transport pet food down the food pipe 31 and then pet food falls down from the funnel-shaped receiver 11 and then from the food storing tank 2 to move out of the food exit 12 into the food trough 13. As the preset period of operating time is up, the timer commands to turn off the power to stop the motor, and then the screw conveyer is stopped, not transporting pet food out of the food exit. Consequently the pet food transported out is limited, or as a definite quantity owing to the preset period of operating time of the motor 312. Thus the pet food dispenser in the invention supplies pet food at preset times for a definite quantity to a pet automatically, without need of a keeper to give food to a pet, very convenient.

As can be understood from the aforesaid description, the pet food dispenser has the following advantages.

1. It has a concise structure possible to be manufactured quickly, and at low cost.

2. Pet food is dispensed at preset times and for a definite quantity, safe and convenient.

3. Pet food can be controlled in frequency and quantity to be dispensed, suitable to different pets.

4. The pet food storing tank can be adjusted in its height to increase or decrease its food quantity to be stored according to necessity.

5. The food trough can be pushed inside the dispenser body, saving the space needed.

While the preferred embodiment of the invention has been described above, it will be reconized and understood that various modifications may be made therein and the appended claims are intended to cover all such modifications which may fall within the spirit and scope of the invention.

What is claimed is:

1. An automatic pet food dispenser for dispensing food at preset times and in a definite quantity, comprising:

a dispenser body having a hollow cylindrical shape, a food exit formed in a front end of a bottom wall, a food trough movably placed in a bottom portion just under said food exit, a funnel-shaped receiver deposited in a center upper portion having an upper opening communicating with a lower opening of a food storing tank and a lower opening communicating with a transporting mechanism;

said food storing tank having an upper opening releasably closed with a cap with one or more air holes, a vertical bellows wall, a lower opening connected to an upper side of said dispenser body and communicating with said funnel-shaped receiver so that pet food stored therein may fall down into said funnel-shaped receiver;

said transporting mechanism consisting of a downwardly sloping food pipe deposited in said dispenser body, a screw conveyor provided in said food pipe, said food pipe sloping down to the front side of said dispenser and having its front end connected to said food exit of said dispenser body, said screw conveyor rotated by a motor and a timer capable of controlling the time of start and stop of said motor and the period of operating time of said motor so that said automatic pet food dispenser may dispense out a definite quantity of pet food stored in said food storing tank through said funnel-shaped receiver, said food pipe and said food exit into said food trough;

said food trough having a recess formed in its front side for pulling and pushing, and said food exit having a projecting-down stop formed on its wall for stopping said food trough from wholly separating from said dispenser body when pulled out.

* * * * *